United States Patent
Mimna et al.

(10) Patent No.: US 9,308,518 B2
(45) Date of Patent: Apr. 12, 2016

(54) ENHANCED SORBENT FORMULATION FOR REMOVAL OF MERCURY FROM FLUE GAS

(71) Applicant: Calgon Carbon Corporation, Pittsburgh, PA (US)

(72) Inventors: Richard A. Mimna, Oakdale, PA (US); Walter G. Tramposch, Moon Township, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 181 days.

(21) Appl. No.: 13/841,801

(22) Filed: Mar. 15, 2013

(65) Prior Publication Data

US 2014/0224121 A1    Aug. 14, 2014

Related U.S. Application Data

(60) Provisional application No. 61/764,712, filed on Feb. 14, 2013.

(51) Int. Cl.
| | | |
|---|---|---|
| *B01D 53/02* | (2006.01) | |
| *B01J 20/20* | (2006.01) | |
| *B01D 53/10* | (2006.01) | |

(52) U.S. Cl.
CPC ............... *B01J 20/20* (2013.01); *B01D 53/02* (2013.01); *B01D 53/10* (2013.01); *B01D 2253/102* (2013.01); *B01D 2253/104* (2013.01); *B01D 2253/106* (2013.01); *B01D 2253/25* (2013.01); *B01D 2257/602* (2013.01)

(58) Field of Classification Search
CPC .. B01D 53/06; B01D 53/64; B01D 2257/602; B01J 20/20
See application file for complete search history.

(56) References Cited

U.S. PATENT DOCUMENTS

| | | | |
|---|---|---|---|
| 1,984,164 | A | 12/1934 | Stock et al. |
| 3,194,629 | A | 7/1965 | Dreibelbis et al. |
| 4,196,173 | A | 4/1980 | deJong et al. |
| 4,491,609 | A | 1/1985 | Degel et al. |
| 4,500,327 | A | 2/1985 | Nishino et al. |
| 4,708,853 | A | 11/1987 | Matviya et al. |
| 5,336,835 | A | 8/1994 | McNamara |
| 5,435,980 | A | 7/1995 | Felsvang et al. |
| 5,695,726 | A | 12/1997 | Lerner |
| 6,589,318 | B2 | 7/2003 | El-Shoubary et al. |
| 6,638,347 | B2 | 10/2003 | El-Shoubary et al. |
| 6,719,828 | B1 | 4/2004 | Lovell et al. |
| 6,808,692 | B2 | 10/2004 | Oehr |
| 6,818,043 | B1 | 11/2004 | Chang et al. |
| 6,848,374 | B2 | 2/2005 | Srinivasachar et al. |
| 6,878,358 | B2 | 4/2005 | Vosteen et al. |
| 6,953,494 | B2 | 10/2005 | Nelson, Jr. |
| 6,960,329 | B2 | 11/2005 | Sellakumar |
| 7,404,940 | B2 | 7/2008 | Higgins et al. |
| 7,435,286 | B2 | 10/2008 | Olsen et al. |
| 7,514,052 | B2 | 4/2009 | Lissianski et al. |
| 8,080,088 | B1 | 12/2011 | Srinivasachar |
| 8,168,147 | B2 | 5/2012 | Olson et al. |
| 8,309,046 | B2 | 11/2012 | Pollack et al. |
| 2004/0003716 | A1 | 1/2004 | Nelson, Jr. |
| 2004/0013589 | A1 | 1/2004 | Vosteen et al. |
| 2004/0074391 | A1 | 4/2004 | Durante et al. |
| 2004/0244657 | A1 | 12/2004 | Srinivasachar et al. |
| 2005/0039598 | A1 | 2/2005 | Srinivasachar et al. |
| 2005/0147549 | A1 | 7/2005 | Lissianski et al. |
| 2006/0048646 | A1 | 3/2006 | Olson et al. |
| 2006/0051270 | A1 | 3/2006 | Brunette |
| 2006/0090646 | A1 | 5/2006 | Sawada et al. |
| 2006/0204418 | A1 | 9/2006 | Chao et al. |
| 2006/0205592 | A1 | 9/2006 | Chao et al. |
| 2007/0122327 | A1 | 5/2007 | Yang et al. |
| 2007/0140941 | A1 | 6/2007 | Comrie |
| 2007/0180990 | A1 | 8/2007 | Downs et al. |
| 2007/0234902 | A1 | 10/2007 | Fair et al. |
| 2008/0134888 | A1 | 6/2008 | Chao et al. |
| 2008/0274874 | A1 | 11/2008 | Heschel et al. |
| 2009/0007785 | A1 | 1/2009 | Kumura et al. |
| 2009/0010828 | A1 | 1/2009 | Holmes et al. |
| 2009/0136401 | A1 | 5/2009 | Yang et al. |
| 2011/0048231 | A1 | 3/2011 | Sinha |
| 2011/0250110 | A1 | 10/2011 | Keiser et al. |
| 2012/0100053 | A1 | 4/2012 | Durham et al. |
| 2012/0183458 | A1 | 7/2012 | Olson et al. |
| 2012/0244355 | A1 | 9/2012 | Pollack et al. |

FOREIGN PATENT DOCUMENTS

| | | |
|---|---|---|
| CA | 2036746 A1 | 2/1992 |
| DE | 588531 | 11/1933 |
| EP | 0289809 A1 | 11/1988 |
| JP | 49-53591 | 5/1974 |
| JP | 49-53592 | 5/1974 |

(Continued)

OTHER PUBLICATIONS

Gleiser et al., "Control of Mercury from MSW Combustors by Spray Dryer Absorption Systems and Activated Carbon Injection", Proceedings of an International Specialty Conference, Williamsburg, Virginia, Mar. 1993.

(Continued)

*Primary Examiner* — Christopher P Jones

(74) *Attorney, Agent, or Firm* — Pepper Hamilton LLP

(57) ABSTRACT

A mercury sorbent and method for enhancing mercury removal performance of activated carbon from flue gas by the addition of non-halogen nitrogen-containing to the flue gas stream are provided herein. Such compositions and methods provide improved mercury adsorption at reduced sorbent injection rates.

21 Claims, 7 Drawing Sheets

(56) References Cited

FOREIGN PATENT DOCUMENTS

| WO | WO 2007/112248 A2 | 10/2007 |
| WO | WO 2011/127323 A2 | 10/2011 |
| WO | WO 2012/030560 A1 | 3/2012 |

OTHER PUBLICATIONS

Granite et al., "Novel Sorbents for Mercury Removal from Flue Gas", Industrial & Engineering Chemistry Research (Apr. 2000), 39(4):1020-1029.

Office of Inspector General, Evaluation Report: Additional Analyses of Mercury Emissions Needed Before EPA Finalizes Rules for Coal-Fired Electric Utilities, Report No. 2005-P-00003, Feb. 3, 2005, pp. 1-54.

White et al. "Parametric Evaluation of Powdered Activated Carbon Injection for Control of Mercury Emissions from a Municipal Waste Combustor," Paper No. 92-40.06, 1992 Annual Meeting, Air and Waste Management Association, Kansas City, Missouri, Jun. 1992.

International Search Report/Written Opinion dated May 22, 2014 received for corresponding PCT/US2014/014605.

ENHANCED SORBENT FORMULATION FOR REMOVAL OF MERCURY FROM FLUE GAS

CROSS-REFERENCE TO RELATED APPLICATIONS

The application claims priority to U.S. Provisional No. 61/764,712, entitled "Enhanced Sorbent Formulation For Removal of Mercury From Flue Gas" filed Feb. 14, 2013, which is hereby incorporated by reference in its entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Mercury is a known environmental hazard and leads to health problems for both humans and non-human animal species. Approximately 50 tons per year are released into the atmosphere in the United States, and a significant fraction of the release comes from emissions from coal burning facilities such as electric utilities. To safeguard the health of the public and to protect the environment, the utility industry is continuing to develop, test, and implement systems to reduce the level of mercury emissions from its plants. In the combustion of carbonaceous materials, it is desirable to have a process wherein mercury and other undesirable compounds are captured and retained after the combustion phase so that they are not released into the atmosphere.

One of the most promising solutions for mercury removal from flue gas is Activated Carbon Injection (ACI). Activated carbon is a highly porous, non-toxic, readily available material that has a high affinity for mercury vapor. This technology is already established for use with municipal incinerators. Although the ACI technology is effective for mercury removal, the short contact time between the activated carbon and the flue gas stream results in an inefficient use of the full adsorption capacity of the activated carbon. Mercury is adsorbed while the carbon is conveyed in the flue gas stream along with fly ash from the boiler. The carbon and fly ash are then removed by a particulate capture device such as an Electrostatic Precipitator (ESP), baghouse filters, or wet scrubbers.

In flue gas streams containing high concentrations of sulfur oxides, mercury removal by the injection of activated carbon is often compromised by the presence of sulfur compounds such as sulfur trioxide. The concentration of sulfur dioxide relative to mercury in a typical flue gas stream can be one million to one or higher, and the concentration of sulfur trioxide in such flue gas streams is typically one thousand to one. For example, high sulfur flue gas streams may contain from about 500 parts-per million per volume (ppmv) to about 2500 ppmv or more sulfur dioxide and from about 2 ppmv to about 20 ppmv or more sulfur trioxide. Water vapor in the flue gas further compounds the problem by combining with sulfur trioxide to form sulfuric acid. For utilities that burn bituminous coals or mixtures of bituminous coals with lower rank sub-bituminous coals, the presence of high levels of sulfur oxides, especially sulfur trioxide, can be a significant concern.

In addition to sulfur oxides that form during coal combustion, sulfur trioxide may also be produced inadvertently in selective catalytic reduction (SCR) processes downstream of the boiler for controlling $NO_x$ emissions, or it may be added to the flue gas to enhance the performance of ESP devices used to capture the fly ash. Regardless of its origins, sulfur trioxide may have unintended consequences beyond its interference with mercury removal that affect the performance and profitability of the power plant. These consequences include corrosion of system components and unwanted increases in plume visibility and duration upon discharge from the stack.

To prevent the interference of sulfur oxides with mercury removal by the injected mercury sorbent, a number of prior art solutions have been proposed wherein gross reductions in total sulfur oxide levels are achieved in the gas phase. Nearly all of these solutions rely upon bulk injections of alkaline or other reactive agents into the flue gas to react chemically with the sulfur oxides, forming salt particulates which do not usually interfere with mercury adsorption by the sorbent. In some cases, the agent is injected as a dry solid (Dry Sorbent Injection (DSI)), while in other methods an aqueous solution of the agent is injected, which rapidly devolatilizes at the temperature of injection to form a very fine, dry powder with even higher reactivity toward sulfur oxides in the duct. For example, trona, a naturally-occurring mixture of sodium carbonate and sodium bicarbonate, is a commercially-available material found to be effective in controlling sulfur oxides when injected into flue gas streams as a dry reactant.

Other alkaline agents, such as calcium oxide (lime), calcium hydroxide (slaked lime), calcium carbonate (limestone), magnesium carbonate (dolomite), magnesium hydroxide, magnesium oxide, and sodium carbonate are also utilized to control sulfur oxide emissions. Solution injection of such agents is represented by Codan's SBS Injection™ technology, which uses an aqueous solution of the chemical reductants sodium bisulfite and sulfite, and is more selective and effective for sulfur trioxide removal. Alternatively, solutions of sodium carbonate, bicarbonate, or hydroxide or thiosulfate can also be used. However, all of these materials and methods suffer disadvantages in that relatively large amounts of the agent must be used for effective control and, more importantly, separate injection systems must be installed independent of mercury sorbent injection, adding cost and complexity to their application. In the case of alkali-based agents, a further disadvantage is found in the negative impact of such materials on the properties of the fly ash collected for subsequent sale to the cement and concrete industry. Although this disadvantage is avoided by using alkaline earth-based agents, these agents generally impart an unwanted increase in resistivity to the ESP, while the alkali-based agents usually have minimal impact on ESP operation.

Where alkaline or other $SO_x$ reactive agents have been incorporated into the pore structure of the sorbents themselves, the intent has been uniformly the removal of the sulfur compounds and not the removal of mercury in the presence of such compounds. Numerous other examples of activated carbons and other sorbents that incorporate $SO_x$-reactive materials within the body of the sorbent have been reported, but none appear to advance the art of mercury removal since they are neither directed to that purpose nor are they likely to offer a preferred solution since major portions of the pore structure available for mercury adsorption are configured preferentially for sulfur oxide removal.

There is a need to provide dry sorbent compositions for mercury removal in flue gas streams containing high concentrations of sulfur oxides, especially sulfur trioxide, that do not depend on the independent injection of alkaline or other reactive agents elsewhere in the system for effective mercury removal, and are inherently effective in a single injection mode. Where such alkaline or reactive agents are used as part of the dry sorbent compositions, there is a further need to limit the impact of these agents on balance-of-plant operations by using only what may be necessary to enhance mercury removal locally at the point of sorbent injection, as well as to avoid incorporation within the body of the porous sorbent to afford increased opportunity for mercury removal. Where independent injection of said alkaline or reactive agents may yet be necessary, there is also a need to reduce the amount of such agents that might otherwise be used, consistent with effective mercury removal and marginal impacts on balance of plant issues.

SUMMARY OF THE INVENTION

Various embodiments are directed to mercury sorbents including an adsorbent material, a halogen source, and a non-halogen nitrogen containing compound. In some embodiments, the non-halogen nitrogen containing compound may be, for example, ammonium bicarbonate salts, ammonium phosphate salts, mixed salt ammonium phosphates, ammonium pyrophosphates, hydrogen ammonium phosphates, dihydrogen ammonium phosphates, and the like and combinations thereof. In certain embodiments, the non-halogen nitrogen containing compound may be ammonium bicarbonate, ammonium carbonate, diammonium phosphate, mono-ammonium phosphate, ammonium chloride, ammonium pyrophosphate, and combinations thereof. The adsorptive material may be any adsorptive material including, but not limited to, carbonaceous char, activated carbon, carbon black, reactivated carbon, zeolite, silica, silica gel, alumina clay, and combinations thereof.

In various embodiments, the halogen source may include an inorganic halogen salt such as, but not limited to, calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, ammonium chloride, ammonium bromide, ammonium iodide, potassium trichloride, potassium tri-bromide, potassium tri-iodide, and combinations thereof. In some embodiments, the halogen source may be a nitrogenous halogen salt such as, for example, chlorine, bromine, iodine, or fluorine, or combinations thereof and ammonium, ammonia, amines, amides, imines, quaternary ammonium, and combinations thereof. In certain embodiments, the halogen source may be calcium bromide, ammonium chloride, ammonium bromide, ammonium iodide, sodium bromide, and combinations thereof. In some embodiments, the halogen source may be chlorine, bromine, and iodide.

The additive mixture of such embodiments may include a non-halogen nitrogen containing compound to halogen source at a ratio of about 3:1, about 2:1, about 1:1, about 1:2, or about 1:3 or any ratio encompassed by these ranges. In some embodiments, the total amount of additive mixture in the mercury adsorbent may be about 0.5 wt. % to about 40 wt. % based on the total weight of the mercury sorbent. In particular embodiments, the total amount of halogen salt may be from about 1 wt. % to about 20 wt. % based on the total weight of the mercury sorbent, and in certain embodiments, the total amount of non-halogen nitrogen containing compound is from about 1 wt. % to about 20 wt. % based on the total weight of the mercury sorbent.

In some embodiments, the sorbent may include additional components such as, for example, an alkaline additive, and in particular embodiments, the alkaline additive may be calcium carbonate, calcium oxide, calcium hydroxide, magnesium carbonate, magnesium hydroxide, magnesium oxide, sodium carbonate, sodium bicarbonate, trisodium hydrogendicarbonate dihydrate, and the liked and combinations thereof.

In certain embodiments, the mercury sorbent may be a dry admixture of adsorptive material and additive mixture. In other embodiments, the adsorptive material may be impregnated with the additive mixture. In such embodiments, the mercury sorbent may have a mean particle diameter of about 1 μm to about 30 μm whether the mercury sorbent is a dry admixture or an impregnated adsorptive material.

Other embodiments are directed to a method for reducing mercury emissions by injecting an adsorptive material into a flue gas stream, injecting a halogen source into the flue gas stream, and injecting a non-halogen nitrogen containing compound into the flue gas stream. In some embodiments, the steps of injecting the adsorptive material, injecting the halogen source, and injecting the non-halogen nitrogen containing compound is carried out simultaneously. In certain embodiments, the adsorptive material, the halogen source, and the non-halogen nitrogen containing compound can be combined as a mixture of adsorptive material, halogen source, and non-halogen nitrogen containing compound before injecting. In particular embodiments, at least the adsorptive material is injected into the flue gas stream before the air pre-heater.

Still other embodiments are directed to methods for reducing mercury emissions including the step of injecting a mercury sorbent comprising an adsorptive material, a halogen salt, and a non-halogen nitrogen containing compound into a flue gas stream, and in particular embodiments, at least the adsorptive material is injected into the flue gas stream before the air pre-heater.

DETAILED DESCRIPTION

Figure 1:
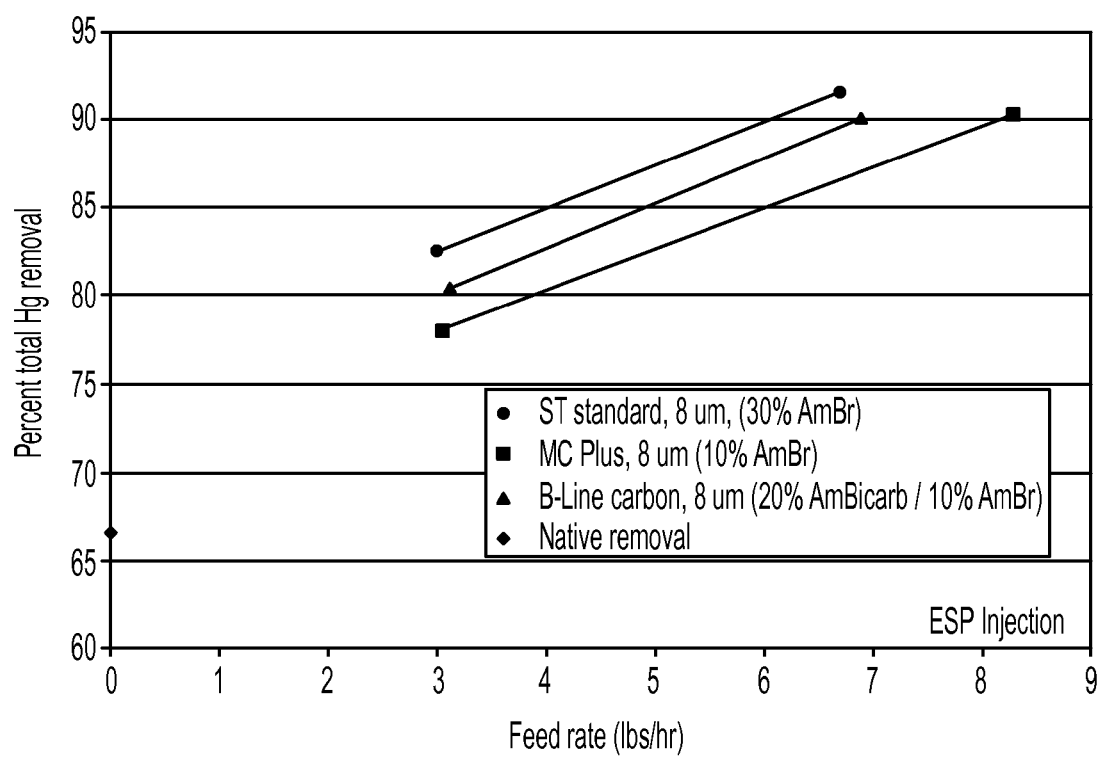
FIG. 1 shows mercury removal versus feed rates of different ammonium salt formulations.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

Embodiments of the invention are directed to mercury sorbents including an adsorptive material and an additive mixture including a halogen source and an non-halogen nitrogen containing compound. Further embodiments are directed to methods for making such mercury sorbents, and still further embodiments are directed to methods for using the mercury sorbents for removal of heavy metals such as mercury from flue gas. The sorbents of the invention may include less halogen or halide than currently available heavy metal sorbents while providing similar heavy metal adsorption to currently available sorbents. Thus, the sorbents of embodiments may provide good adsorption characteristics at lower cost than similar sorbents.

The adsorptive material may be any adsorptive material known in the art such as, for example, a carbonaceous char, activated carbon, carbon black, reactivated carbon, zeolite, silica, silica gel, alumina clay, or a combination thereof. In some embodiments, the adsorptive material may be activated carbon, carbonaceous char, carbon black, or reactivated carbon. Such adsorptive materials may have any mean particle diameter (MPD). For example, in some embodiments, the MPD of the adsorptive material may be from about 0.1 µm to about 100 µm, and in other embodiments, the MPD may be about 1 µm to about 30 µm. In still other embodiments, the MPD of the adsorptive material may be less than about 15 µm, and in some particular embodiments, the MPD may be about 2 µm to about 10 µm, about 4 µm to about 8 µm, or about 5 µm or about 6 µm. In certain embodiments, the mercury sorbent may have an MPD of less than about 12 µm, or in some embodiments, less than 7 µm. In some embodiments, the mercury sorbent has a surface area of at least about 300 m$^2$/g.

The halogen source may be any compound having at least one halogen atom and may include halogen salts such as inorganic halogen salts. Numerous inorganic halogen salts are known in the art and include bromides, bromates, hypobromites, iodides, iodates, hypoiodites, chlorides, chlorates, and hypochlorites. The halogen species may be any elemental halogen, for example, chlorine, bromine, iodine, or fluorine. In some embodiments, the halogen species may be paired with, for example, an alkali metal such as lithium, sodium, and potassium or alkaline earth metal such as magnesium, or calcium counterion. Non-limiting examples of inorganic halogen salts include calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, ammonium chloride, ammonium bromide, ammonium iodide, potassium tri-chloride, potassium tri-bromide, potassium tri-iodide, and the like and combinations thereof. In particular embodiments, the halogen salt may be a bromine salt, such as calcium bromide ($CaBr_2$), and in some embodiments, the halogen salt may be a nitrogenous halogen salt, where the halogen is chlorine, bromine, iodine, or fluorine, or combinations thereof. The nitrogenous species may be selected from the group consisting of ammonium, ammonia, amines, amides, imines, quaternary ammonium, and the like. More specific examples of such nitrogenous halogen salts include ammonium chloride, ammonium bromide, and ammonium iodide. In still further embodiments, the halogen source may be an organo-halide such as, for example, bromoform, bromoethane, 2-bromoethanol, 1-bromopropane, 1-bromobutane, 2-bromobutane, N-nonyl bromide, and chloro- or iodo-forms of these compounds, and combinations thereof. Further organo-halides include aliphatic chain containing halogen containing compounds such as, for example, 1-Bromopentane, 1-Bromohexane, 1-Bromoheptane, 1-Bromooctane, 1-Bromodecane, 1-Bromododecane, 1-Bromotetradecane, 1-Bromohexadecane, 1-Bromooctadecane, and chloro- or iodo-forms of these compounds, and combinations thereof. In particular embodiments, the halogen source may be ammonium bromide. In such embodiments, the oxidant content of the halogen source may be near to or above about 0.15 equivalents per 100 grams of adsorptive material, wherein one equivalent of oxidant is defined as the amount required to react with one mole of electrons in a redox reaction.

Embodiments are not limited to particular non-halogen nitrogen containing compounds, and in certain embodiments, the non-halogen nitrogen containing compounds may be neutral, or non-alkaline, non-halogen nitrogen containing compounds. In some embodiments, the non-halogen nitrogen containing compound include, for example, ammonium bicarbonate salts, ammonium phosphate salts, mixed salt ammonium phosphates, ammonium pyrophosphates, hydrogen ammonium phosphates, dihydrogen ammonium phosphates, and the like and combinations thereof. For example, in various embodiments, the non-halogen nitrogen containing compound may be ammonium bicarbonate, ammonium carbonate, diammonium phosphate, mono-ammonium phosphate, ammonium chloride, ammonium pyrophosphate, and combinations thereof. In other embodiments, the non-halogen nitrogen containing compound may be an amide, urea, urea containing compounds, or any combination thereof. In such embodiments, where the non-halogen nitrogen containing compound is an amide, the amide may be dimethylacetamide, acetamide, sulfonamide, carbamide, and the like or combinations thereof. In particular embodiments, the non-halogen nitrogen containing compound is urea.

The adsorptive material and the additive mixture may be combined in any way for example, in some embodiments, the additive mixture may be dispersed in a liquid and the sorbent may be contacted with the liquid to create an impregnated sorbent. Such impregnation processes are well known in the art and produce sorbents in which the additive is dispersed on, or otherwise physically associated, with outer surfaces and within the pores of sorbent material.

In other embodiments, the adsorptive material with an additive mixture may be co-ground to produce a sorbent that is a dry admixture of adsorptive material and additives. In such dry admixtures, the adsorptive material and the additives of the additive mixture are separate and distinct particles having similar particle diameters that are not physically associated with one another. Thus, the morphology of the dry admixture sorbents is different than impregnated sorbents.

The mercury sorbents in a dry admixture may have any mean particle diameter (MPD). For example, in some embodiments, the MPD of the mercury sorbent may be from about 0.1 μm to about 100 μm, and in other embodiments, the MPD may be about 1 μm to about 30 μm. In still other embodiments, the MPD of the mercury sorbent may be less than about 15 μm, and in some embodiments, the MPD may be about 2 μm to about 10 μm, about 4 μm to about 8 μm, or about 5 μm or about 6 μm. In certain embodiments, the mercury sorbent may have an MPD of less than about 12 μm, or in some embodiments, less than 7 μm. In some embodiments, increased selectivity for mercury adsorption over sulfur trioxide adsorption may be provided by co-milling activated carbon with an additive mixture to an MPD of less than about 10 μm or less than about 7 μm. Although not wishing to be bound by theory, the small MPD may improve the selectivity of mercury adsorption as the halogen effectively oxidizes the mercury and the alkalinity interferes with the adsorption of the sulfur trioxide.

In some embodiments, the additive mixture composition may have a non-halogen nitrogen containing compound to halogen source ratio about 3:1, about 2:1, about 1:1, about 1:2, about 1:3, or any ratio within these exemplary ratios. The total amount of the additive mixture may vary among embodiments and may vary depending on the use of the mercury sorbent. For example, in various embodiments, the total amount may be about 0.5 wt. % to about 40 wt. % based on the total weight of the sorbent, and in certain embodiments, the additive mixture may be about 1 wt. % to about 30 wt. %, about 10 wt. % to about 30 wt. %, about 20 wt. % to about 30 wt. %, or any range or individual weight percentage within these ranges. In further embodiments, the total amount of the additive mixture may be greater than or equal to about 0.30 equivalents per 100 grams of the mercury sorbent.

Individually, in some embodiments, the halogen source may be about 0.5 wt. % to about 30 wt. % of the mercury sorbent, and in other embodiments, the halogen source may be about 1 wt. % to about 20 wt. %, about 3 wt. % to about 15 wt. %, about 5 wt. % to about 10 wt. % or any range or individual weight percentage within these ranges. The non-halogen nitrogen containing compound in such embodiments may be about 0.5 wt. % to about 30 wt. % of the mercury sorbent, and in some embodiments, the non-halogen nitrogen containing compound may be about 1 wt. % to about 20 wt. %, about 5 wt. % to about 20 wt. %, about 10 wt. % to about 20 wt. % or any range or individual weight percentage within these ranges. In further embodiments, the non-halogen nitrogen containing compound may be greater than or equal to about 0.20 equivalents per 100 grams of the mercury sorbent.

In general, adsorptive materials such as activated carbon remove mercury with less efficiency in flue gas streams having high concentrations of acid gases and, in particular, sulfur oxide species, $SO_x$, such as, $SO_3$ and/or $SO_2$, and other acid gases. Sulfur dioxide, $SO_2$ can be oxidized to sulfur trioxide by oxygen in the flue gas in the presence of catalytic sites on the adsorbent surface. The overall effect of adsorption of these sulfur oxides precludes or strongly interferes with the adsorption of mercury from the flue gas.

The interference by sulfur oxide species may be further enhanced in the presence of water, which is commonly present in flue gas streams. The mercury sorbents of various embodiments may have an inherent hydrophobic character. For example, while activated carbon is inherently hydrophobic to the extent that it is wet more readily by organic solvents than by water, all activated carbons are not completely hydrophobic, and certain portions of the surface of activated carbons may exhibit partially hydrophilic characteristics. In some embodiments, mercury removal may be further enhanced by combining the mercury sorbents described above with one or more secondary agents having high affinity, high selectivity, and rapid kinetics for acid gas removal, which may be collectively referred to herein as "acid gas suppression agents" or "acid gas suppressors." In some embodiments, the acid gas agents may not be physically incorporated into and within the mercury sorbent itself. Rather, the acid gas agents may be provided as a separate component of the mercury sorbent that is blended with the adsorptive agent; therefore, the maximum pore space for mercury reaction and adsorption can be maintained on the mercury sorbent. In certain embodiments, the acid gas suppression agents may have high affinity, high selectivity, and rapid kinetics for sulfur reactive species, and such compositions are referred to herein as "$SO_x$ suppression agents" or "$SO_x$ suppressors." The resulting mercury sorbent thus includes an adsorptive material, an additive mixture, and one or more $SO_x$ suppression agents. Any type of $SO_x$ suppression agent known in the art may be used in the mercury sorbent of various embodiments. For example, the $SO_x$ suppression agent may be an oxidizing agent, alkaline agent, dual-function agent having both alkalinity and oxidation capabilities, or adsorptive agent treated to specifically adsorb sulfur oxides.

In some embodiments, the acid gas or $SO_x$ suppression agent may be an alkaline additive. Numerous alkaline agents are known in the art and are currently used to remove sulfur oxide species from flue gas and any such alkaline agent may be used in the invention. For example, in various embodiments, the alkaline additive may be alkali oxides, alkaline earth oxides, hydroxides, carbonates, bicarbonates, phosphates, silicates, aluminates, and combinations thereof, and in certain embodiments, the alkaline additive may be calcium carbonate ($CaCO_3$; limestone), calcium oxide (CaO; lime), calcium hydroxide ($Ca(OH)_2$; slaked lime); magnesium carbonate ($MgCO_3$; dolomite), magnesium hydroxide ($Mg(OH)_2$), magnesium oxide (MgO), sodium carbonate ($Na_2CO_3$), sodium bicarbonate ($NaHCO_3$), trisodium hydrogendicarbonate dihydrate ($Na_3H(CO_3)_2.2H_2O$; trona), and the like and combinations thereof. In various embodiments, the alkaline additive may be provided at a concentration greater than or equal to about 0.15 equivalents per 100 grams of mercury sorbent, wherein one equivalent of the alkaline additive is defined as the amount required to produce one mole of hydroxyl ions or to react with one mole of hydrogen ions. In particular embodiments, such alkaline additive may have a relatively high surface area such as, for example, above 100 $m^2$/g for neat materials. High surface area materials may provide improved kinetics and capabilities for acid gas or $SO_x$ mitigation while complementing halogen compounds and other added oxidants to provide oxidation of elemental mercury. Because alkaline additive are highly polar materials that may associate and bond with water, in various embodiments, alkaline agents may be combined with the primary mercury sorbent as a physical admixture and may not generally be present on the sorbent surface or contained within the sorbent pore structure.

In other embodiments, the mercury sorbent may include from about 10 wt. % to about 70 wt. %, about 10 wt. % to about 60 wt. %, or about 10 wt. % to about 50 wt. % $SO_x$ suppression or about 15 wt. % to about 70 wt. %, about 15 wt. % to about 60 wt. %, or about 15 wt. % to about 50 wt. % $SO_x$ suppression agent or about 20 wt. % to about 70 wt. %, about 20 wt. % to about 60 wt. %, or about 20 wt. % to about 50 wt. % $SO_x$ suppression agent. Without wishing to be bound by theory, improved acid gas and $SO_x$ suppression may allow for improved mercury adsorption by the mercury sorbent, and increasing the concentration of the acid gas or $SO_x$ suppression agent. In particular, an ammonium halide, amine halide, or quaternary ammonium halide such as, for example, ammonium bromide, may improve mercury adsorption beyond currently available adsorbents thereby providing a mercury sorbent that includes, for example, low activated carbon content but that removes mercury from flue gas streams as effectively as high activated carbon content sorbents. Low activated carbon sorbents may have far less of a deleterious impact on the quality of the coal fly ash with respect to its use in Portland cement.

The compositions of various embodiments described above may allow for a higher percentage of active halide and alkaline agents to be included in the injected mercury sorbent. Mercury sorbents that are impregnated with an additive mixture by treating with an aqueous solution of the additive mixture, for example, commercial brominated carbon sorbents, especially those impregnated with elemental bromine, can only retain a small percentage of an additive on the surface of the mercury sorbent, and impregnation tends to clog the pores of porous mercury sorbents reducing the surface area available for mercury adsorption. In contrast, the percentage of active halide and acid gas or $SO_x$ suppression agent in a dry mixture may be greater than about 10 wt. %, greater than about 15 wt. %, greater than about 20 wt. %, or greater than about 30 wt. % and up to about 50 wt. %, up to about 60 wt. %, or up to about 70 wt. % without exhibiting a reduction in mercury adsorption efficiency.

Moreover, the sorbents of various embodiments exhibit improved stability during manufacture, storage, and injection than currently available impregnated sorbents. For example, producing acid gas or $SO_x$ suppression agents having a mean particle diameter of less than about 15 μm or 20 μm using any of the acid gas or $SO_x$ suppression agents described herein is difficult. Moreover, all of the acid gas or $SO_x$ suppression agents are somewhat hygroscopic, and ammonium halide, amine halide, or quaternary ammonium halide acid gas or $SO_x$ suppression agents readily absorb water. Non-halogen nitrogen containing compounds, for example, diammonium phosphate, are hydrophilic and also readily absorb water. Rapid moisture pickup causes substantial re-agglomeration making maintenance of acid gas or $SO_x$ suppression agents at mean particle diameters of less than about 15 μm difficult. Without wishing to be bound by theory, re-agglomeration may be reduced as the result of the mercury sorbent acting as separators and competing desiccants reducing the amount of moisture in the dry mixture and allowing long term storage and maintenance of acid gas or $SO_x$ suppression agents with mean particle diameters of less than about 12 μm. Reduction in particles size may also provide more rapid and selective kinetics allowing improved synergistic effects.

In addition, at elemental bromine loadings above 10 wt. % to 15 wt. %, the equilibrium vapor phase concentrations under ambient conditions may rise above safe and acceptable threshold limit values (0.66 mg/m³ TWA; 2.0 mg/m³ STEL), creating problems in handling and use, and $SO_x$ suppression agents such as ammonium halide, amine halide, or quaternary ammonium halide may provide fire retardant properties that reduce self-heating and combustion associated with metal halide containing sorbents in which the metal cation can catalyze the oxidation of the carbon.

The mercury sorbent and the additives may be combined by any method. For example, in some embodiments, the mercury sorbent and the additives may be combined by physically mixing, blending or grinding the materials into a single mercury sorbent that can then be injected into a flue gas stream. In some embodiments, the adsorptive material and additives are ground to a powder form separately and then the powders are physically blended. Thereafter, the powder admixture is injected into a common air stream, such as into the flue gas, or by use of other means. In other embodiments, combining may occur during use such that the adsorbent material and additives may be held in different reservoirs and injected simultaneously into a flue gas stream. Alternatively, the admixture can be employed as a fixed bed.

In certain embodiments, the adsorptive material and the additives may be co-milled. For example, in various embodiments, an adsorptive material and an additive or additive mixture may be combined and co-milled or sized to about the same particle size distribution, which in some embodiments, may be a mean particle diameter of less than or equal to about 12 μm less than or equal to about 10 μm, or less than about 7 μm. Without wishing to be bound by theory, reducing the MPD of the sorbent, combined with localized additives or additive mixtures added to the sorbent, but not contained within the sorbent pore structure, has been found to be surprisingly effective in facilitating rapid and selective mercury adsorption despite sulfur trioxide concentrations that are orders of magnitude higher than the mercury levels in the flue gas. This effect has been shown particularly effective when all of the components of the mercury sorbent are combined and co-milled or otherwise sized to a MPD of less than or equal to about 12 μm. Co-milling may be carried out by any means. For example, in various embodiments, the co-milling may be carried out using bowl mills, roller mills, ball mills, jet mills or other mills or any grinding device known to those skilled in the art for reducing the particle size of dry solids.

The mercury sorbent of such embodiments may include any of the adsorptive materials described above, any additive described above, and any acid gas or $SO_x$ suppression agents described above. In certain embodiments, the adsorptive material may be an activated carbon, carbon black, or reactivated carbon. In some embodiments, the additives provide rapid ancillary oxidation of elemental mercury in the gas stream such as, for example, a halide compound, and in particular embodiments, the halide compound may be less stable at elevated temperatures than alkali or alkaline-earth metal analogs. In further embodiments, the additive may include an additional agent such as, for example, an additional non-halogen nitrogen containing compound. In some embodiments, the additional non-halogen nitrogen containing compound may be diammonium phosphate.

Further embodiments are directed to methods for removing mercury from flue gas by injecting a mercury sorbent including an adsorptive material, a halogen source, and a non-halogen nitrogen containing compound into a flue gas stream. In some embodiments, the adsorptive material, a halogen source, and a non-halogen nitrogen containing compound can be injected into the flue gas stream individually. In particular embodiments, each of the adsorptive material, a halogen source, and a non-halogen nitrogen containing compound may be injected into the flue gas through different ports at different locations in the flue gas stream. For example, the halogen source may be introduced into the boiler and the non-halogen nitrogen containing compound and adsorptive material can be injected at different locations upstream of the boiler. In other embodiments, the adsorptive material, halogen source, and non-halogen nitrogen containing compound can be injected at the same location in the flue gas stream through separate ports. In further embodiments, two or more of the adsorptive material, halogen source, and non-halogen nitrogen containing compound can be combined and injected simultaneously. For example, a mixture of the halogen source and non-halogen nitrogen containing compound can be injected simultaneously through a single port and the adsorptive material can be injected through a different port at the same location or a different location in the flue gas stream. In other embodiments, a mixture of the adsorptive material and the halogen source can be injected simultaneously through a single port and the non-halogen nitrogen containing compound can be injected through a different port at the same location or a different location in the flue gas stream. In still further embodiments, the adsorptive material, the halogen source, and the non-halogen nitrogen containing compound can be injected into the flue gas stream simultaneously. For example, a mixture of the adsorptive material, the halogen source, and the non-halogen nitrogen containing compound can be injected into the flue gas stream.

The adsorptive material, halogen source, and non-halogen nitrogen containing compound or various mixtures of these components can be injected anywhere in the flue gas stream from the boiler to the baghouse. In particular embodiments, at least the adsorptive material may be injected before (downstream) of the air preheater. As discussed above, the halogen source and non-halogen nitrogen containing compound can be injected at the same location (i.e., before the air preheater) or a different location in the flue gas stream (i.e., upstream or downstream of the air preheater).

While such compositions may be particularly effective in flue gas streams having high $SO_x$ the sorbents described herein may be used to adsorb mercury in any flue gas streams regardless of the $SO_3$ concentration. For example, the sorbents of various embodiments may be used in flue gas streams having no or extremely low $SO_3$ content or flue gas streams containing high concentrations of other acid gases such as HCl, HF, or $NO_x$ species. In some embodiments, the mercury sorbent and the acid gas or $SO_x$ suppression agent additives may be combined prior to injection into the flue gas stream by, for example, mixing or blending, the mercury sorbent with the acid gas or $SO_x$ suppression agent additives. In other embodiments, the mercury sorbent and the acid gas or $SO_x$ suppression agent additives may be injected separately into the flue gas stream and combined in the flue gas stream itself. In such embodiments, the acid gas or $SO_x$ suppression agent additives may adsorb sulfur oxide species such as sulfur trioxide and sulfur dioxide reducing the likelihood that such sulfur oxide species will adsorb to the mercury sorbent. The increased availability for mercury adsorption of surface area on the mercury adsorptive agent may thus increase mercury adsorption.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

Ammonium bromide containing carbons were found to substantially outperform carbons prepared with sodium bromide, especially in the presence of $SO_3$ and formulations containing 30 wt. %. Activated carbon containing ammonium bromide was tested for mercury removal in flue gas containing detectable ppm levels of $SO_3$. The ammonium bromide readily decomposed to afford HBr and ammonia. The ammonia in turn reacted with and neutralized $SO_3$ before the $SO_3$ could bind with the carbon.

Previous testing showed that ammonium chloride could be substituted for at least two thirds of the ammonium bromide in a 30 wt. % sorbent with no loss in performance. To further evaluate this effect, a sorbent was prepared that contained 20 wt. % unmilled ammonium bicarbonate and 10 wt. % ammonium bromide. Injection of this material at the ESP inlet at the Mercury Research Center (MRC) resulted in markedly improved mercury capture versus a formulation of the same particle size with just 10 wt. % ammonium bromide as seen in FIG. 1. The observed improvement in mercury capture performance afforded by the ammonia (derived from the decomposition of the ammonium bicarbonate in the flue gas) was unexpected in light of the low sulfur coal burned during testing producing flue gas with no detectable $SO_3$. Thus, an ammonia source in mercury sorbent may be beneficial even in the absence of detectable levels of $SO_3$.

Example 2

Figure 2:
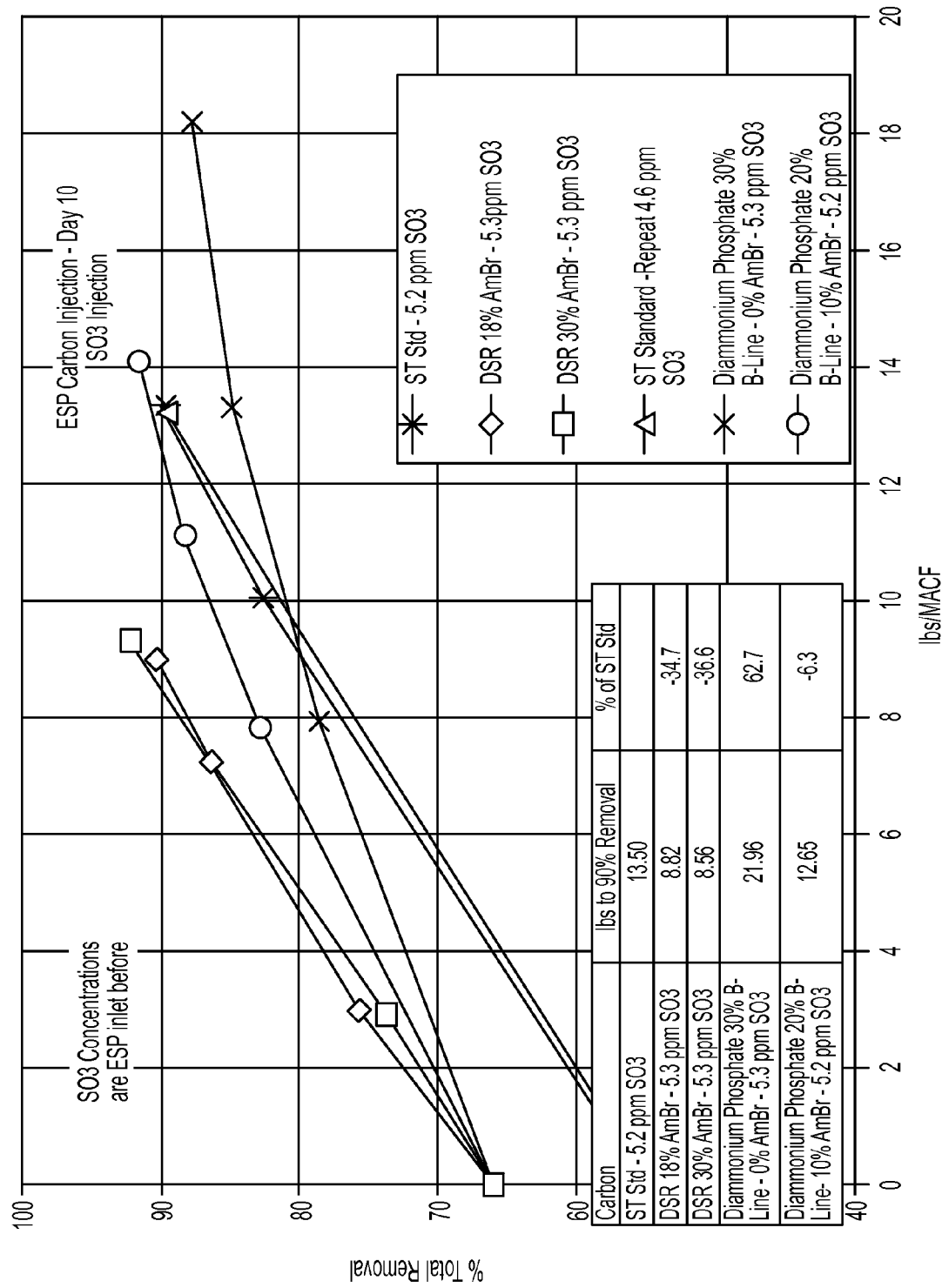
FIG. 2 illustrates the effect of mercury removal when using different ammonia precursors.

Subsequent tests at the MRC using the procedures identified in Example 1 were completed using diammonium phosphate as the ammonia precursor. A formulation containing 20 wt. % diammonium phosphate and 10 wt. % ammonium bromide was also found to outperform the a sorbent containing 30 wt. % ammonium bromide as seen in FIG. 2.

Example 3

Figure 3:
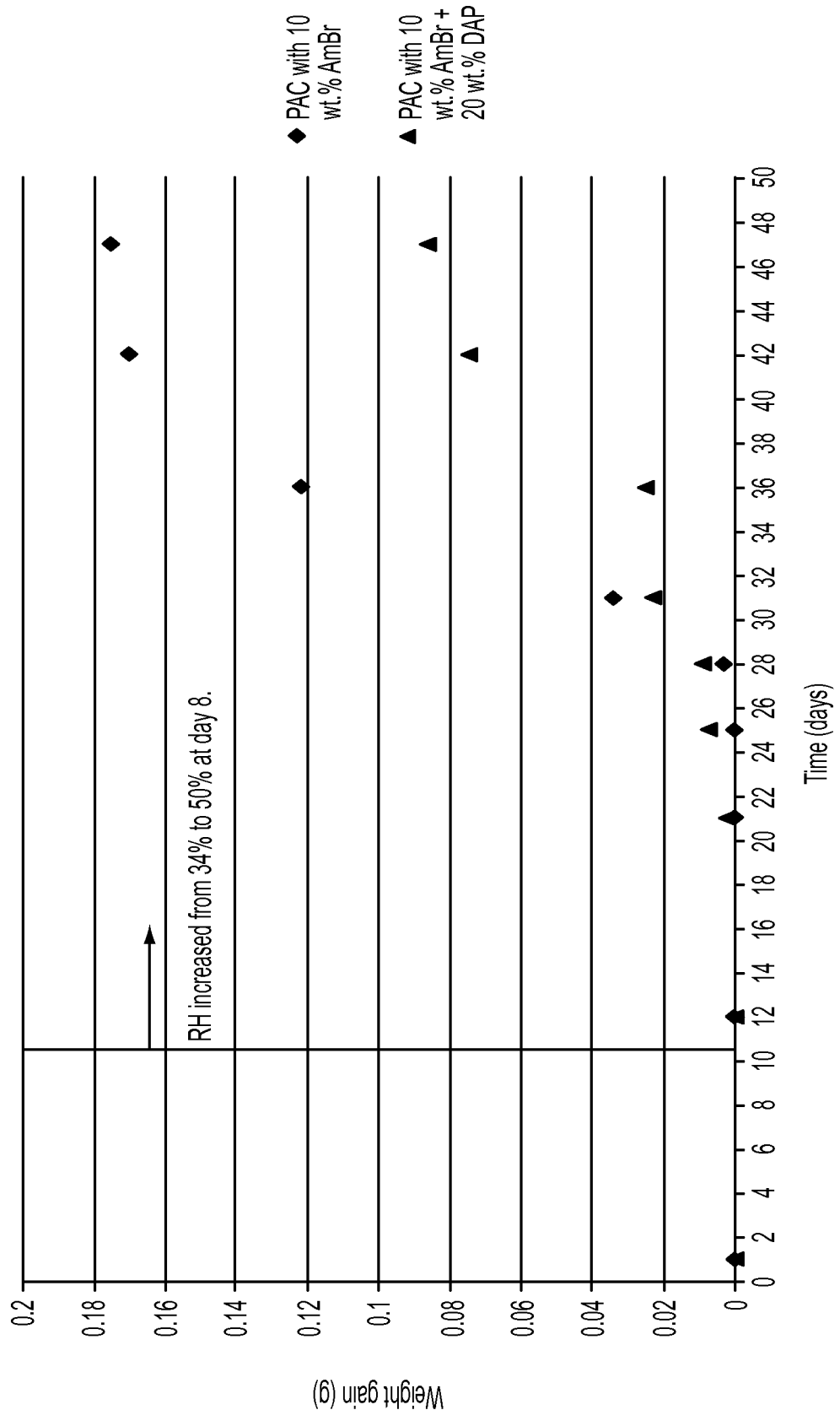
FIG. 3 illustrates a comparison of the ammonium bromide related corrosion rates of carbon steel coupons immersed in samples of activated carbon with diammonium phosphate or without, as evidenced by their weight gain over time.

Diammonium phosphate was added to an ammonium bromide containing carbon and stored at 50% relative humidity. This formulation was found to slow the corrosion of carbon steel coupons that were submerged in carbon mixtures as determined by the slower increase in weight over time of the sample with diammonium phosphate versus the one without as shown in FIG. 3. Non-halogen ammonium salts also were not found to generate HCl or HBr as unwanted byproducts.

Example 4

It is known that several ammonium salts such as diammonium phosphate, monoammonium phosphate, and ammonium sulfate, for example, possess fire retardant properties. It was hypothesized that having such salts present in an activated carbon formulation can help to render the carbon more thermally stable and less prone to smoldering and fires that arise from self-heating.

Figure 4:
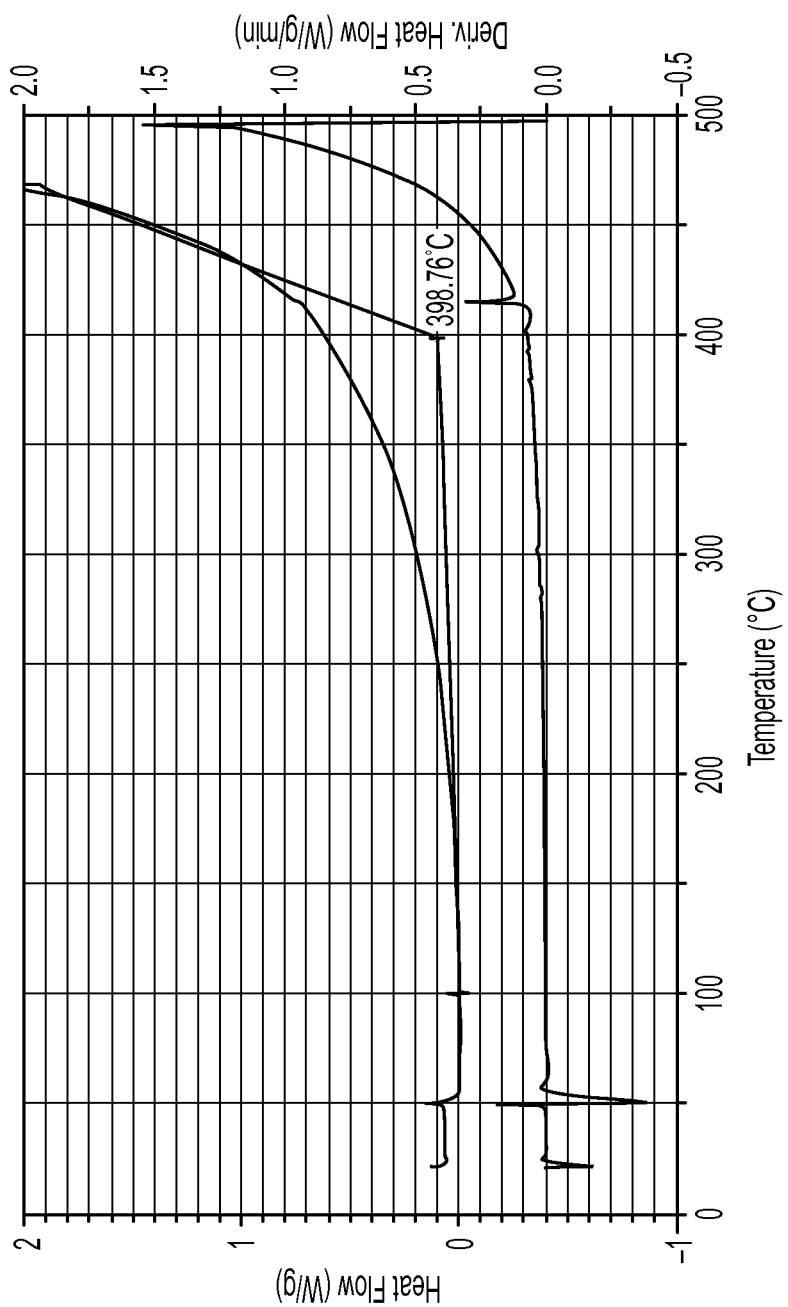
FIG. 4 shows the DSC determination of the ignition temperature (398.76° C.) of powdered B-line carbon.
Figure 5:
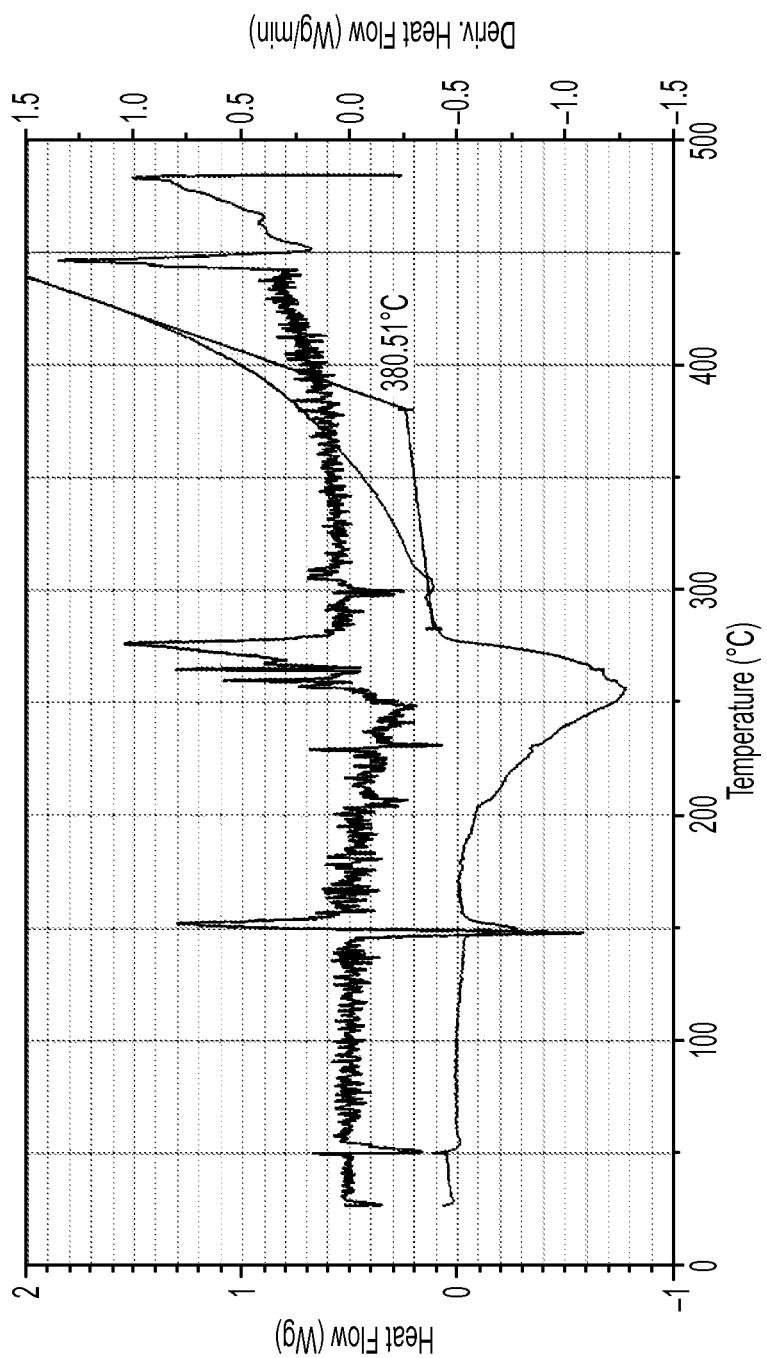
FIG. 5 shows the DSC determination of the ignition temperature (380.51° C.) of powdered B-line carbon with 30 wt. % ammonium bromide.
Figure 6:
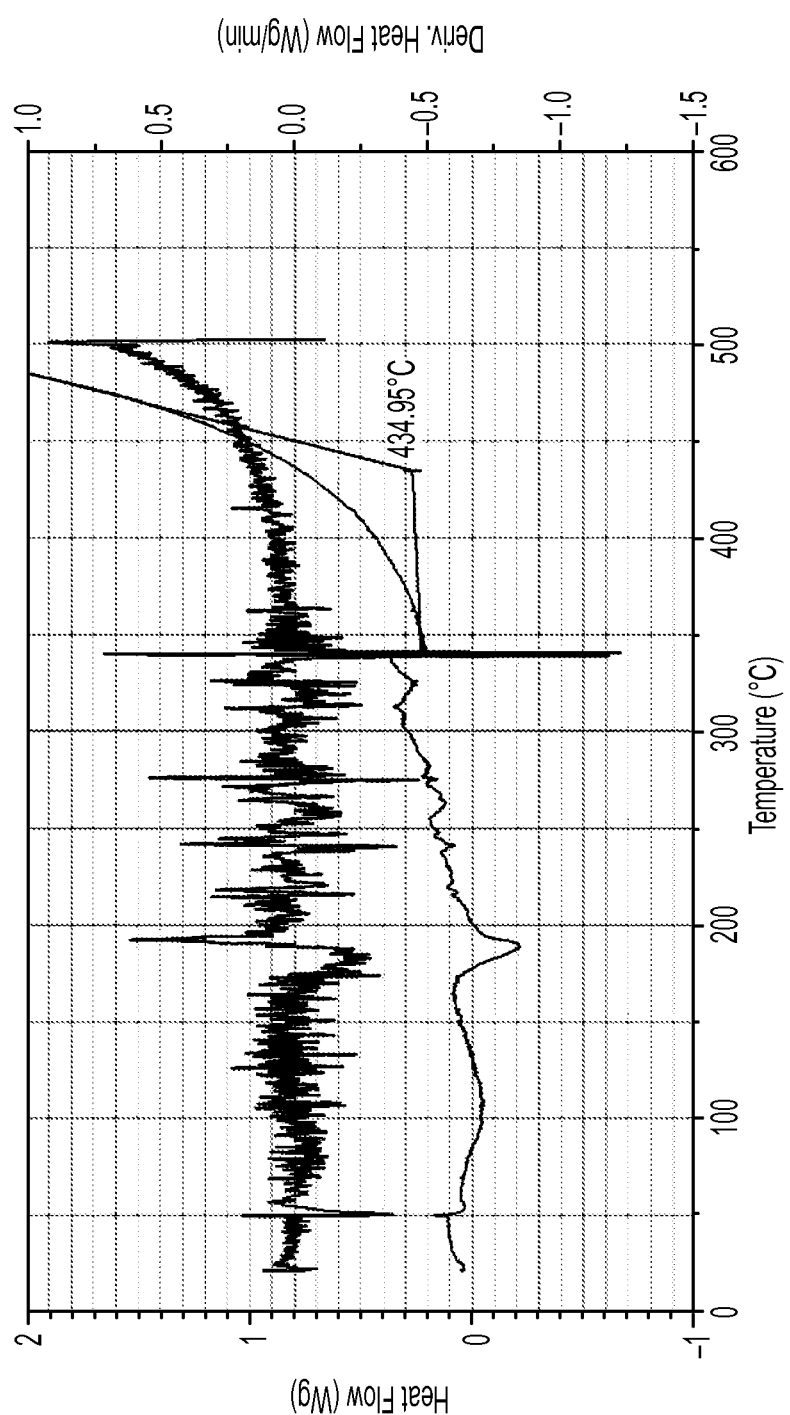
FIG. 6 shows the DSC determination of the ignition temperature (434.95° C.) of powdered B-line carbon with 10 wt. % diammonium phosphate.
Figure 7:
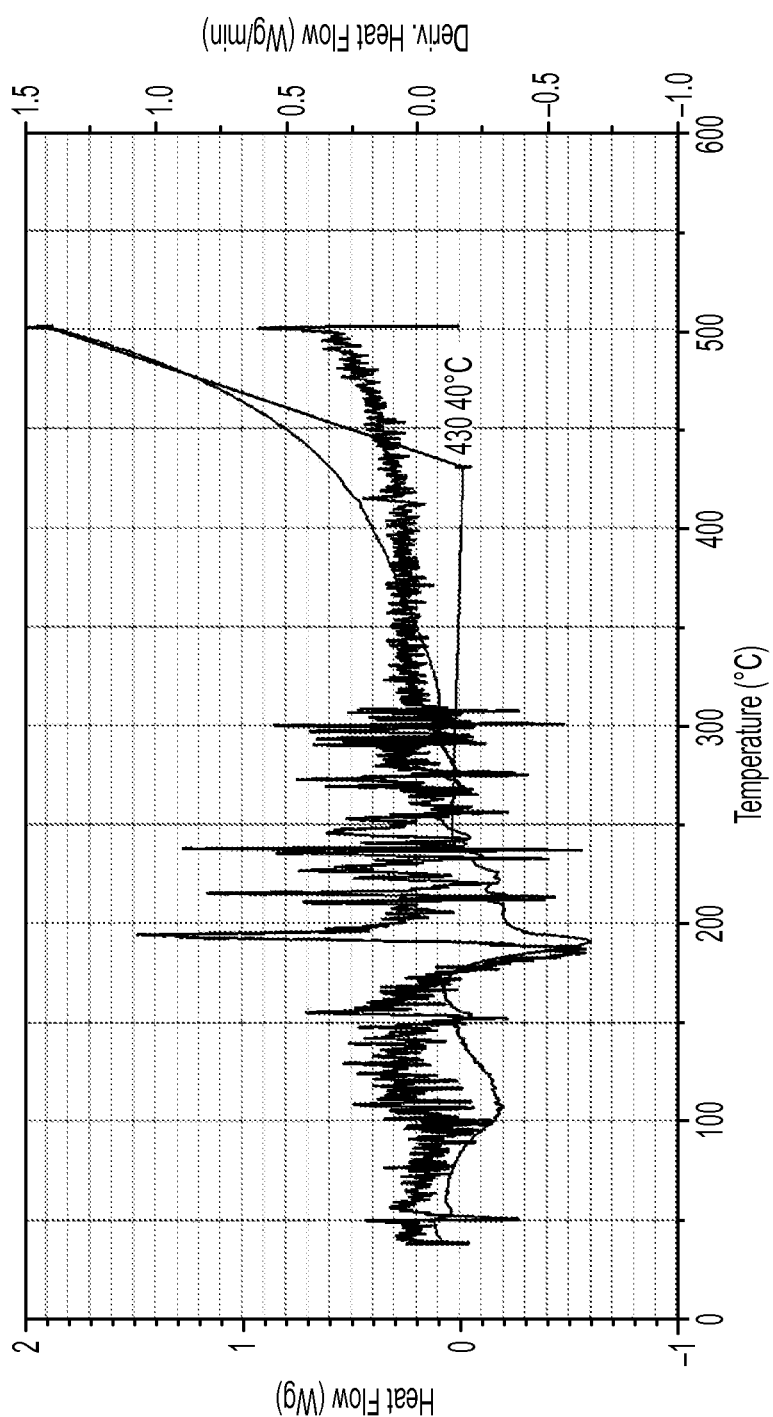
FIG. 7 shows the DSC determination of the ignition temperature (430.40° C.) of powdered B-line carbon with 10 wt. % ammonium bromide and 20 wt. % diammonium phosphate.

The ignition temperature of powdered activated carbon without any impregnants (FIG. 4), powdered activated carbon with 30 wt. % ammonium bromide (FIG. 5), powdered activated carbon with 10 wt. % diammonium phosphate (FIG. 6), powdered activated carbon with 10 wt. % ammonium bromide and 20 wt. % diammonium phosphate (FIG. 7), were determined by differential scanning calorimetry (DSC). Powdered activated carbon without any impregnants had an ignition temperature of about 399° C., and sorbent mixtures of activated carbon and 30 wt. % ammonium bromide exhibited an ignition temperature of about 381° C. In contrast, sorbent mixtures containing activated carbon and 10 wt. % diammonium phosphate exhibited an ignition temperature of about 435° C., and a formulation containing 10 wt. % ammonium bromide and 20 wt. % diammonium phosphate had an ignition temperature of about 430° C. The results reveal that having the ammonium salt, diammonium phosphate, present in an activated carbon formulation with or without ammonium bromide did increase the ignition temperature, providing a more thermally stable formulation.

What is claimed is:

1. A mercury sorbent comprising:
   an adsorptive material; and
   an additive mixture, the additive mixture comprising:
   a halogen source; and
   a non-halogen nitrogen containing compound, selected from the group consisting of ammonium phosphate salts, mixed salt ammonium phosphates, ammonium pyrophosphates, hydrogen ammonium phosphates, dihydrogen ammonium phosphates, and combinations thereof.

2. The mercury sorbent of claim 1, wherein the non-halogen nitrogen containing compound is selected from the group consisting of diammonium phosphate, mono-ammonium phosphate, ammonium pyrophosphate, and combinations thereof.

3. The mercury sorbent of claim 1, wherein the halogen source comprises an inorganic halogen salt or bromine, iodine, or chlorine.

4. The mercury sorbent of claim 3, wherein the inorganic halogen salt is selected from calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, ammonium chloride, ammonium bromide, ammonium iodide, potassium trichloride, potassium tri-bromide, potassium tri-iodide, and combinations thereof.

5. The mercury sorbent of claim 1, wherein the halogen source comprises a nitrogenous halogen salt.

6. The mercury sorbent of claim 5, wherein the nitrogenous halogen salt comprises chlorine, bromine, iodine, or fluorine, or combinations thereof and ammonium, ammonia, amines, amides, imines, quaternary ammonium, and combinations thereof.

7. The mercury sorbent of claim 1, wherein the halogen source is selected from the group consisting of chlorine, bromine, iodine, calcium bromide, ammonium chloride, ammonium bromide, ammonium iodide, and combinations thereof.

8. The mercury sorbent of claim 1, wherein the additive mixture comprises non-halogen nitrogen containing compound to halogen source at a ratio of about 3:1, about 2:1, about 1:1, about 1:2, or about 1:3.

9. The mercury sorbent of claim 1, wherein the total amount of additive mixture in the mercury adsorbent is about 0.5 wt. % to about 40 wt. % based on the total weight of the mercury sorbent.

10. The mercury sorbent of claim 1, wherein the total amount of halogen salt is from about 1 wt. % to about 20 wt. % based on the total weight of the mercury sorbent.

11. The mercury sorbent of claim 1, wherein the total amount of non-halogen nitrogen containing compound is from about 1 wt. % to about 20 wt. % based on the total weight of the mercury sorbent.

12. The mercury sorbent of claim 1, further comprising an alkaline additive.

13. The mercury sorbent of claim 12, wherein the alkaline additive is selected from the group consisting of calcium carbonate, calcium oxide, calcium hydroxide; magnesium carbonate, magnesium hydroxide, magnesium oxide, sodium carbonate, sodium bicarbonate, trisodium hydrogendicarbonate dihydrate, and combinations thereof.

14. The mercury sorbent of claim 1, wherein the mercury sorbent comprises a dry admixture of the adsorptive material and the additive mixture.

15. The mercury sorbent of claim 1, wherein the adsorptive material is impregnated with the additive mixture.

16. The mercury sorbent of claim 1, wherein the mercury sorbent has a mean particle diameter of about 1 μm to about 30 μm.

17. The mercury sorbent of claim 1, wherein the adsorptive material is selected from the group consisting of carbon based adsorbents and non-carbon based adsorbents.

18. The mercury sorbent of claim 1, wherein the adsorptive material is selected from the group consisting of carbonaceous char, activated carbon, graphite, graphene, carbon black, reactivated carbon, zeolite, silica, silica gel, alumina clay, and combinations thereof.

19. A method for reducing mercury emissions comprising: injecting an adsorptive material into a flue gas stream; injecting a halogen source into the flue gas stream; and injecting a non-halogen nitrogen containing compound into the flue gas stream; wherein the steps of injecting the adsorptive material, injecting the halogen source, and injecting the non-halogen nitrogen containing compound is carried out simultaneously.

20. The method of claim 19, wherein the adsorptive material, the halogen source, and the non-halogen nitrogen containing compound are combined.

21. The method of claim 19, wherein at least the adsorptive material is injected into the flue gas stream before the air pre-heater.

* * * * *